(12) United States Patent
Zhu et al.

(10) Patent No.: US 11,438,018 B2
(45) Date of Patent: Sep. 6, 2022

(54) GENERATING A DIGITAL MODULATION SIGNAL AND AN ANALOG MODULATION SIGNAL ACCORDING TO AN INPUT SIGNAL OF THE FREQUENCY MODULATION CIRCUIT

(71) Applicant: Silergy Semiconductor Technology (Hangzhou) LTD, Hangzhou (CN)

(72) Inventors: Xunyu Zhu, Hangzhou (CN); Yan Ye, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/237,236

(22) Filed: Apr. 22, 2021

(65) Prior Publication Data

US 2021/0344366 A1 Nov. 4, 2021

(30) Foreign Application Priority Data

Apr. 30, 2020 (CN) .......................... 202010361701.3

(51) Int. Cl.
*H04B 1/04* (2006.01)
*H04B 1/00* (2006.01)
*H04B 1/66* (2006.01)

(52) U.S. Cl.
CPC ............. *H04B 1/04* (2013.01); *H04B 1/0014* (2013.01); *H04B 1/667* (2013.01); *H04B 2001/0491* (2013.01)

(58) Field of Classification Search
CPC ......... H03L 7/099; H03L 7/093; H03L 7/085; H03L 7/18; H03L 7/091; H03L 7/1976; H03L 7/087; H03L 7/0891; H03L 7/10; H03L 2207/06; H03L 2207/12; H03L 7/187; H03L 2207/50; H03L 7/0991; H03L 7/23; H03L 7/183; H03L 7/185; H03L 7/199; H03L 7/0805; H03L 7/0893; H03L 7/107; H03L 7/16; H03L 7/07; H03L 7/08; H03L 7/089; H03L 7/104; H03B 5/1228; H03B 5/1212; H03B 5/1215; H03B 5/1265; H03B 21/01; H03B 5/124; H03B 5/1243; H03B 5/1253; H03B 27/00; H03B 5/1293; H03B 2201/0208; H03B 2200/0074; H03B 2201/0266; H03B 5/366; H03C 3/0941; H03C 3/0925; H03C 3/0958; H03C 5/00; H03C 3/0933; H03C 3/095; H03C 3/0966; H03C 3/0991; H03C 3/0975; H03C 3/20; H03C 3/40; H03C 3/225; H03C 3/00

See application file for complete search history.

(56) References Cited

U.S. PATENT DOCUMENTS

| | | |
|---|---|---|
| 4,344,185 A | 8/1982 | Cook et al. |
| 4,625,319 A | 11/1986 | Krawitz |
| 4,670,888 A | 6/1987 | Smith |
| 6,246,864 B1 | 6/2001 | Koike |

(Continued)

*Primary Examiner* — Golam Sorowar

(57) ABSTRACT

A frequency modulation circuit can include: a modulation circuit configured to generate a digital modulation signal and an analog modulation signal according to an input signal of the frequency modulation circuit; and a phase-locked loop having a voltage-controlled oscillator configured to receive a reference frequency, and to modulate a frequency of an output signal of the voltage-controlled oscillator according to the analog modulation signal and the digital modulation signal.

18 Claims, 7 Drawing Sheets

(56) References Cited

U.S. PATENT DOCUMENTS

| | | |
|---|---|---|
| 7,194,246 B2 | 3/2007 | Sorrells et al. |
| 8,269,571 B2 | 9/2012 | Bare |
| 8,824,594 B2 | 9/2014 | Mahoney et al. |
| 8,965,290 B2 | 2/2015 | Place |
| 9,627,975 B2 | 4/2017 | Khlat et al. |
| 2009/0153254 A1* | 6/2009 | Yu .......................... H03C 3/095 331/16 |
| 2012/0286888 A1* | 11/2012 | Hsieh ................... H03B 5/1215 331/117 FE |
| 2020/0144032 A1* | 5/2020 | Ulrich ............... H01L 21/31116 |

\* cited by examiner

US 11,438,018 B2

GENERATING A DIGITAL MODULATION SIGNAL AND AN ANALOG MODULATION SIGNAL ACCORDING TO AN INPUT SIGNAL OF THE FREQUENCY MODULATION CIRCUIT

RELATED APPLICATIONS

This application claims the benefit of Chinese Patent Application No. 202010361701.3, filed on Apr. 30, 2020, which is incorporated herein by reference in its entirety.

FIELD OF THE INVENTION

The present invention generally relates to the field of wireless communication, and more particularly to frequency modulation circuits and transmitters.

BACKGROUND

Traditional FM transmitters may generally realize modulation of a carrier signal by an FM circuit with a mixer, and the carrier signal after being modulated is a high-frequency signal suitable for channel transmission. As compared with FM transmitters with mixers, FM transmitters with phase-locked loops have more advantages in terms of power consumption, circuit area, and manufacturing costs such that the related applications are becoming more and more extensive.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
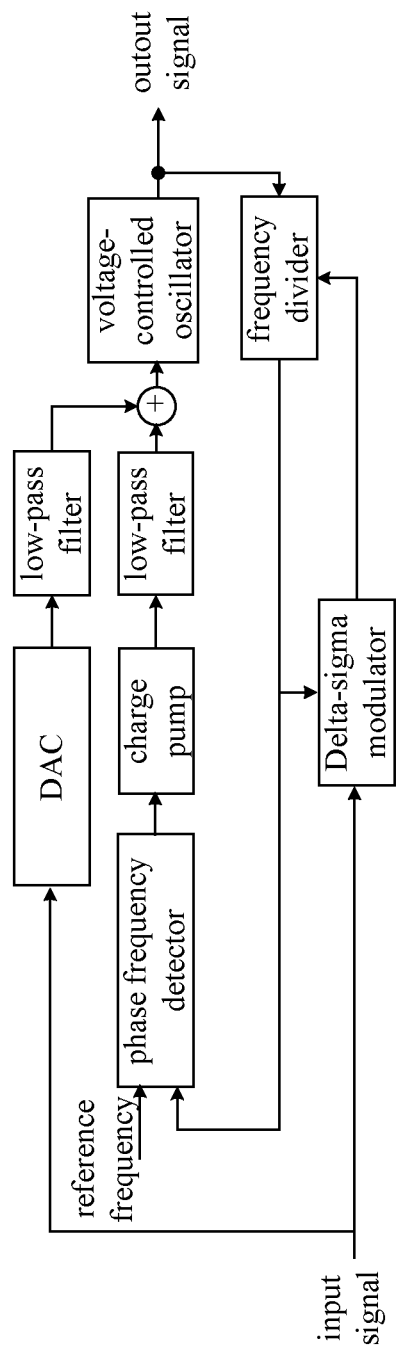
FIG. 1 is a schematic block diagram of an example frequency modulation circuit.

Referring now to FIG. 1, shown is an example frequency modulation circuit of a transmitter with a phase-locked loop. When the phase-locked loop works alone, the frequency of the output signal can be locked at the reference frequency. After the modulation signal is introduced into the phase-locked loop, the frequency modulation circuit may generate a modulated signal that fluctuates within a certain range with the reference frequency as the center, and the modulated signal can be output after power amplification. In this example, the frequency modulation method shown requires the introduction of a high-precision digital-to-analog converter (DAC). However, the design of a high-precision DAC can be complicated, resulting in an increase in chip area and power consumption. In addition, the voltage-controlled oscillator (VCO) has a higher output noise gain to the modulation path corresponding to the DAC.

Figure 2:
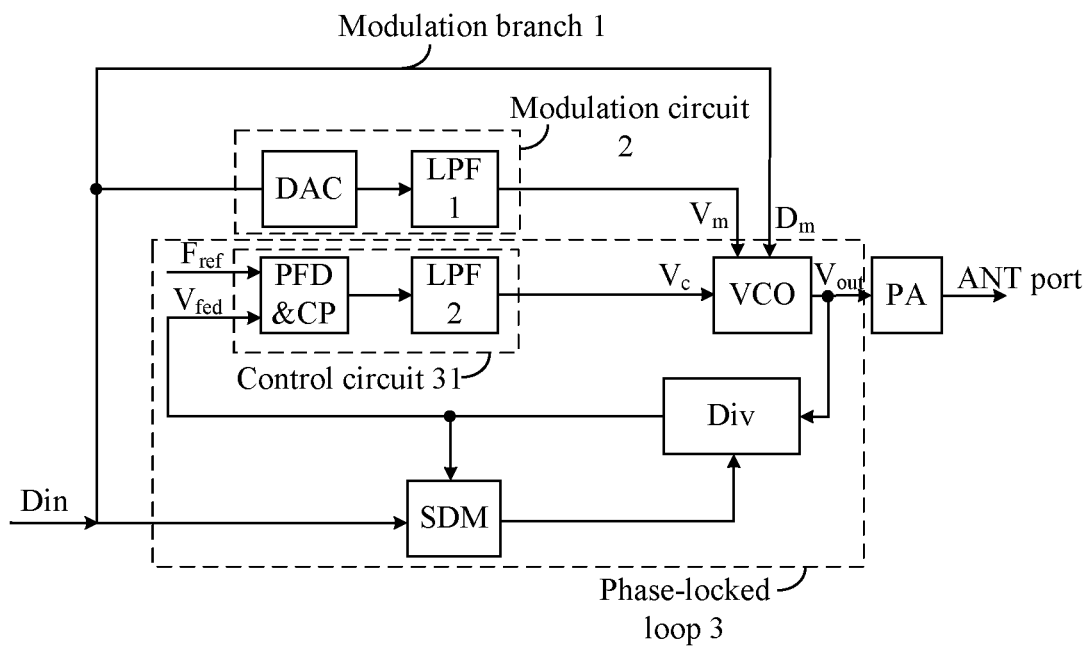
FIG. 2 is a schematic block diagram of an example transmitter, in accordance with embodiments of the present invention.

Referring now to FIG. 2, shown is a schematic block diagram of an example transmitter in accordance with embodiments of the present invention. In this particular example, the transmitter can include a frequency modulation circuit and power amplifier PA, where the frequency modulation circuit can include a modulation circuit and phase-locked loop 3 with a VCO. The phase-locked loop may receive the reference frequency, and control the frequency of the output signal (e.g., after being divided) to be equal to the reference frequency without the modulation circuit. In particular embodiments, the modulation circuit can generate digital modulation signal Dm and analog modulation signal Vm according to input signal Din, and then modulate the frequency of output signal Vout according to digital modulation signal Dm and analog modulation signal Vm, such that the frequency of the output signal may fluctuate within a preset range centered on the reference frequency. For example, the reference frequency is the center frequency of the transmitting channel, and the preset range is determined by input signal Din. Further, the modulated output signal Vout can be amplified by power amplifier PA, and then transmitted by the transmitter antenna.

The modulation circuit can include modulation branch 1 and modulation circuit 2. In particular embodiments, input signal Din can include a high-digit code and a low-digit code. In this example, modulation branch 1 can directly generate digital modulation signal Dm according to the high-digit code, and modulation circuit 2 can generate analog modulation signal Vm according to the low-digit code, in order to control the VCO. For example, modulation circuit 2 can include a DAC. The DAC can convert the high-digit code into an analog signal, which may be filtered by low-pass filter LPF1 to generate analog modulation signal Vm, in order to control the VCO.

The phase-locked loop with VCO can receive reference frequency Fref, and can modulate the frequency of the output signal of the VCO according to analog modulation signal Vm and digital modulation signal Dm. For example, phase-locked loop 3 can include control circuit 31, sigma-delta modulator SDM, the VCO, and frequency divider Div. For example, control circuit 31 can include a phase frequency detector (PFD), a charge pump (CP), and low-pass filter LPF2. For example, sigma-delta modulator SDM can perform sigma-delta modulation on input signal Din, and frequency divider Div can divide output signal Vout according to the output digital code of sigma-delta modulator SDM, in order to generate feedback signal Vfed that represents output signal Vout. For example, the average value of the output digital code of sigma-delta modulator SDM is equal to input signal Din. The PFD can also generate an error signal according to reference frequency Fref and feedback signal Vfed. Then, the charge pump can be charged and discharged according to the error signal to output a corresponding voltage signal, which can be filtered by low-pass filter LPF2 to output control signal Vc, in order to control the VCO. As discussed above, analog modulation signal Vm, digital modulation signal Dm, and control signal Vc may jointly modulate the frequency of output signal Vout.

Figure 3:
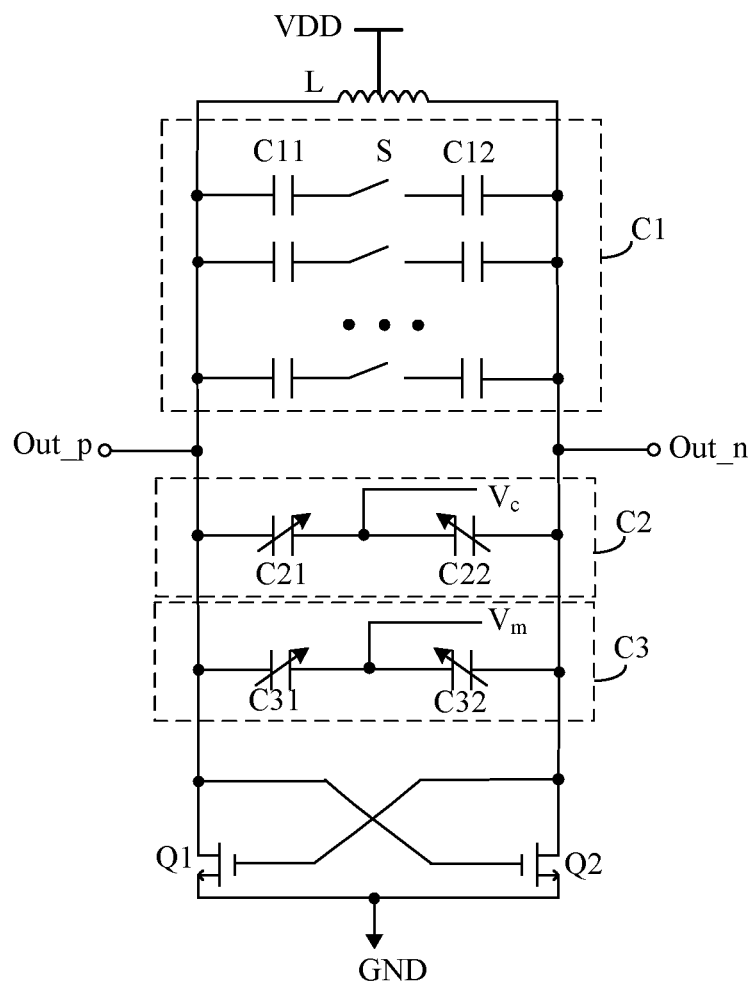
FIG. 3 is a schematic block diagram of an example voltage-controlled oscillator, in accordance with embodiments of the present invention.

Referring now to FIG. 3, shown is a schematic block diagram of an example voltage-controlled oscillator in accordance with embodiments of the present invention. In this particular example, the VCO can include switched capacitor array C1, a variable capacitor array, and inductor L with a middle tap connected to power supply VDD. Further, the VCO can include two differential output terminals Out_p and Out_n, in order to output differential output signal Vout. In addition, the VCO can include power switches Q1 and Q2. For example, the source terminals of power switches Q1 and Q2 can connect to ground, the drain terminal of power switch Q1 can connect to the gate terminal of power switch Q2 and differential output terminal Out_p, and the gate terminal of power switch Q1 can connect to the drain terminal of power switch Q2 and differential output terminal Out_n. In particular embodiments, the inductor and capacitors in the switched capacitor array C1 and the variable capacitor array may form LC resonant circuits for tuning. When there are oscillations in LC resonant circuits, energy loss can be generated in the resonant circuit, which may result in attenuation of the oscillation signal. In this case, power switches Q1 and Q2 can provide current to the resonant circuit, in order to supplement oscillation loss.

Switched capacitor array C1 can include multiple groups of capacitor modules connected in parallel, where each group of capacitor modules can include switch S, and capacitors C11 and C12 connected in series. In addition, the capacitance of capacitor C11 can be the same as that of capacitor C12. In this example, digital modulation signal Dm can control the on and off states of switch S in switched capacitor array C1, thereby controlling whether capacitors C11 and C12 are connected to the resonant circuit, in order to adjust the total capacitance of the resonant circuit and to realize frequency modulation of output signal Vout. When switch S is controlled to be turned on by digital modulation signal Dm, capacitors C11 and C12 can be connected to the resonant circuit, the total capacitance of the resonant circuit can increase, and the oscillation frequency may decrease. When switch S is controlled to be turned off by digital modulation signal Dm, capacitors C11 and C12 may not be connected to the resonant circuit, the total capacitance of the resonant circuit can decrease, and the oscillation frequency may increase.

Figure 4:
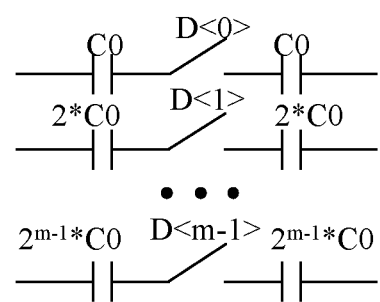
FIG. 4 is a schematic block diagram of a first example switched capacitor array, in accordance with embodiments of the present invention.

Referring to FIG. 4, shown is a schematic block diagram of a first example switched capacitor array in accordance with embodiments of the present invention. In particular embodiments, the switched capacitor array is a binary weighted capacitor array. For example, the capacitance value of the next group of the capacitor module can be twice of the capacitance value of the previous group of capacitor modules in the switched capacitor array; that is, the capacitance ratio between adjacent capacitor modules can be 2 times. For example, the capacitance value of the first and second capacitors in the first group is C0, and the capacitance value of the first and second capacitors in the second group is 2C0. In particular embodiments, digital modulation signal Dm is an m-bit binary number that respectively controls the on and off states of switches in the switched capacitor array, and the number m is the number of capacitor modules (e.g., the number of switches).

Figure 5:
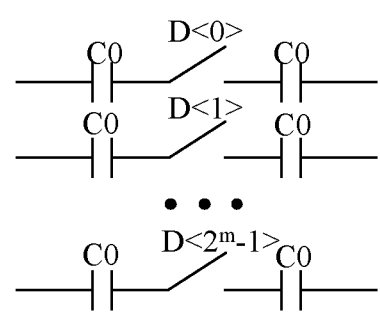
FIG. 5 is a schematic block diagram of a second example switched capacitor array, in accordance with embodiments of the present invention.

Referring to FIG. 5, shown is a schematic block diagram of a second example switched capacitor array in accordance with embodiments of the present invention. In particular embodiments, the switched capacitor array is a unit weighted capacitor array. For example, the unit weighted capacitor array can include an amount of unit capacitors, where the capacitance value of each unit capacitor is the same. That is, the capacitance value of each group of capacitor modules can be the same in the switched capacitor array. In particular embodiments, digital modulation signal Dm can be an m-bit binary number that is converted into an 2m-bit digital code by a digital logic control circuit, in order to control the on and off states of the switches, where the number 2m is the number of capacitor modules (e.g., the number of switches).

Figure 6:
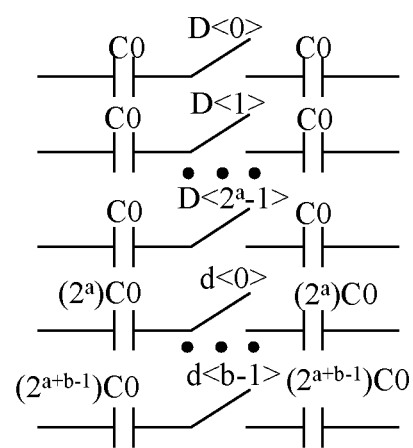
FIG. 6 is a schematic block diagram of a third example switched capacitor array, in accordance with embodiments of the present invention.

Referring to FIG. 6, shown is a schematic block diagram of a third example switched capacitor array in accordance with embodiments of the present invention. In particular embodiments, the switched capacitor array can include a binary weighted capacitor array and a unit weighted capacitor array. Here, the capacitance value of the next group of the capacitor module can be twice of the capacitance value of the previous group of capacitor module in the binary weighted capacitor array, and the capacitance value of each group of capacitor modules can be the same in the unit weighted capacitor array. In particular embodiments, digital modulation signal Dm is an (a+b)-bit binary number. For example, the low b-bit binary number can control the on and off states of the switches in the binary weighted capacitor array, and the high a-bit binary number can be converted into a $2^a$-bit digital code by a digital logic control circuit, in order to control the on and off states of the switches in the unit weighted capacitor array. Moreover, the capacitance of the first capacitor in the first group of capacitor modules in the binary weighted capacitor array can be $2^a$ times the capacitance of the unit capacitor in the unit weighted capacitor array, where the number $2^a+b$ is the number of capacitor modules (e.g., the number of switches).

Referring again to FIG. 3, the variable capacitor array can include variable capacitor arrays C2 and C3 connected in parallel. For example, variable capacitor array C2 can include variable capacitors C21 and C22. Moreover, the capacitance of variable capacitor C21 can be the same as that of variable capacitor C22. Further, the common terminal of variable capacitors C21 and C22 can connect to an external control terminal, in order to receive control signal Vc. Also, the voltage at the common terminal of variable capacitors C21 and C22 can be controlled according to control signal Vc, in order to adjust the capacitance value of variable capacitor array C2, thereby adjusting the total capacitance of the resonant circuit and modulating the frequency of the output signal. Similarly, variable capacitor array C3 can include variable capacitors C31 and C32. Moreover, the capacitance of variable capacitor C31 can be the same as that of variable capacitor C32. Further, the common terminal of variable capacitors C31 and C32 can connect to an external control terminal, in order to receive analog modulation signal Vm. Also, the voltage at the common terminal of variable capacitors C31 and C32 can be controlled according to analog modulation signal Vm, in order to adjust the capacitance value of variable capacitor array C3, and thereby adjusting the total capacitance of the resonant circuit and modulating the frequency of the output signal.

Figure 7:
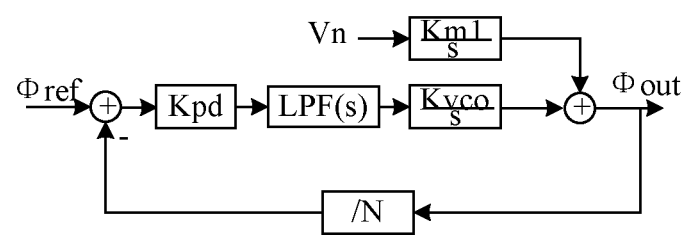
FIG. 7 is a model diagram of an example transfer function of the output noise of the second modulation circuit and the output signal of the voltage-controlled oscillator in accordance with embodiments of the present invention.

Referring now to FIG. 7, shown is a model diagram of an example transfer function of the output noise of the second modulation circuit and the output signal of the voltage-controlled oscillator in accordance with embodiments of the present invention. In particular embodiments, the frequency division ratio control branch controlled by sigma-delta modulator SDM may be ignored. Optionally, the input signal can include a high m-bit binary number and a low n-bit binary number. In particular embodiments, the frequency resolution controlled by modulation circuit 2 can be fres1, and the frequency resolution controlled by modulation branch 1 can be fres2. The modulation gain of the voltage-controlled oscillator controlled by modulation circuit 2 can be km1, and the modulation gain of the voltage-controlled oscillator controlled by modulation branch 1 can be km2. Also, the range of the output voltage of DAC can be 0-Vdac. Thus, frequency modulation range fm of the voltage-controlled oscillator and modulation gain km1 can be expressed by the following formulas (1) and (2).

$$f_m = (2^m - 1) f_{res2} + (2^n - 1) f_{res1} \quad (1)$$

$$k_{m1} = (2^n - 1) f_{res1} / V_{dac} \quad (2)$$

In particular embodiments, the output noise of modulation circuit 2 is Vn. For example, output noise Vn of modulation circuit 2 can be generated by the noise generated by the DAC after being filtered by low pass filter LPF1. Moreover, the output noise of the frequency modulation circuit is $\Phi_{out}$. In order to derive transfer function G(s) of output noise Vn of modulation circuit 2 to output noise $\Phi_{out}$, reference frequency Fref can be set to be zero. Here, the frequency division ratio of frequency divider Div is N, the gain of the PFD is Kpd, the gain of low-pass filter LPF2 is LPF2(s), and the gain of the VCO controlled by control signal Vc is $K_{VCO}$. Thus, transfer function G(s) can be expressed by the following formula (3).

$$G(s) = \Phi_{out} / V_n = k_{m1} * s * (N*s) / [N*s + k_{pd} * LPF2(s) * K_{vco}] \quad (3)$$

It can be seen from transfer function G(s) that the contribution of the noise generated by the DAC to output noise $\Phi_{out}$ can be reduced by reducing modulation gain Km1. As discussed above, the analog modulation can be combined with the digital modulation, in order to reduce the frequency modulation range controlled by the analog modulation circuit, and thereby reducing the gain of the voltage-controlled oscillator to the output noise of the analog modulation circuit and reducing the output noise of the frequency modulation circuit. In addition, the design complexity of the DAC can be reduced, and the area of the modulation circuitry can be reduced by rationally arranging the number of bits of the DAC and the number of low-digit code bits. In general, the frequency modulation circuit has certain advantages in terms of power consumption and area, and may also to a certain extent overcome the contradiction between frequency resolution and the frequency modulation range.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A frequency modulation circuit, comprising:
   a) a modulation circuit configured to generate a digital modulation signal and an analog modulation signal according to an input signal of the frequency modulation circuit, wherein the modulation circuit comprises a first modulation circuit configured to generate the digital modulation signal according to high-digit codes of the input signal, and a second modulation circuit configured to generate the analog modulation signal according to low-digit codes of the input signal; and
   b) a phase-locked loop having a voltage-controlled oscillator configured to receive a reference frequency, and to modulate a frequency of an output signal of the voltage-controlled oscillator according to the analog modulation signal and the digital modulation signal.

2. The frequency modulation circuit of claim 1, wherein the second modulation circuit comprises:
   a) a digital-to-analog converter configured to convert the high-digit codes into an analog signal; and
   b) a low-pass filter configured to filter the analog signal to generate the analog modulation signal.

3. The frequency modulation circuit of claim 1, wherein the voltage-controlled oscillator comprises a switched capacitor array and a variable capacitor array.

4. The frequency modulation circuit of claim 3, wherein the high-digit codes are configured to control the switched capacitor array and adjust a capacitance value of the switched capacitor array, in order to modulate the frequency of the output signal.

5. The frequency modulation circuit of claim 3, wherein the voltage-controlled oscillator further comprises an inductor configured to form an oscillation circuit with the switched capacitor array and the variable capacitor array, and wherein the inductor, the switched capacitor array, and the variable capacitor array are coupled in parallel.

6. The frequency modulation circuit of claim 3, wherein the switched capacitor array comprises multiple groups of capacitor modules connected in parallel, and wherein each group of capacitor module comprises a switch and capacitors connected in series.

7. The frequency modulation circuit of claim 6, wherein the digital modulation signal controls the on and off states of the switches in each group of capacitor modules, in order to adjust the capacitance of the switched capacitor array.

8. The frequency modulation circuit of claim 6, wherein each group of capacitor modules comprises the switch, a first capacitor, and a second capacitor, and wherein the switch is connected in series between the first capacitor and the second capacitor.

9. The frequency modulation circuit of claim 8, wherein the capacitance of the first capacitor is the same as that of the second capacitor.

10. The frequency modulation circuit of claim 6, wherein the capacitance value of each group of capacitor modules is the same in the switched capacitor array.

11. The frequency modulation circuit of claim 6, wherein the capacitance value of a next group of the capacitor modules is twice of the capacitance value of a previous group of capacitor modules in the switched capacitor array.

12. The frequency modulation circuit of claim 6, wherein the switched capacitor array comprises a first part and a second part, wherein the capacitance value of each group of capacitor modules is the same in the first part, and wherein the capacitance value of a next group of the capacitor modules is twice the capacitance value of a previous group of capacitor modules in the second part.

13. The frequency modulation circuit of claim 3, wherein the variable capacitor array comprises variable capacitors, and wherein the capacitance value of the variable capacitor array is adjusted according to the low-digit codes and the error information between the output signal and the reference frequency.

14. The frequency modulation circuit of claim 13, wherein the variable capacitor array comprises a first variable capacitor array and a second capacitor variable that are coupled in parallel.

15. The frequency modulation circuit of claim 14, wherein the first variable capacitor array comprises a first variable capacitor and a second variable capacitor, and wherein the capacitance of the first variable capacitor is the same as that of the second variable capacitor.

16. A frequency modulation circuit, comprising:
   a) a modulation circuit configured to generate a digital modulation signal and an analog modulation signal according to an input signal of the frequency modulation circuit; and
   b) a phase-locked loop having a voltage-controlled oscillator configured to receive a reference frequency, and to modulate a frequency of an output signal of the voltage-controlled oscillator according to the analog modulation signal and the digital modulation signal, wherein the phase-locked loop comprises a control circuit configured to generate a control signal according to the reference frequency and the output signal of the voltage-controlled oscillator, in order to control the voltage-controlled oscillator thereby modulating the frequency of the output signal of the voltage-controlled oscillator.

17. The frequency modulation circuit of claim 16, wherein the phase-locked loop further comprises a frequency divider configured to divide the frequency of the output signal according to the input signal of the frequency modulation circuit and the output signal of the voltage-controlled oscillator, in order to generate a feedback signal.

18. The frequency modulation circuit of claim 17, wherein the control circuit comprises:
   a) a phase frequency detector configured to generate an error signal according to the reference frequency and the feedback signal;
   b) a charge pump configured to charge and discharge according to the error signal to output a corresponding voltage signal; and
   c) a low-pass filter configured to filter the voltage signal and output the control signal.

* * * * *